United States Patent Office 3,333,519
Patented Aug. 1, 1967

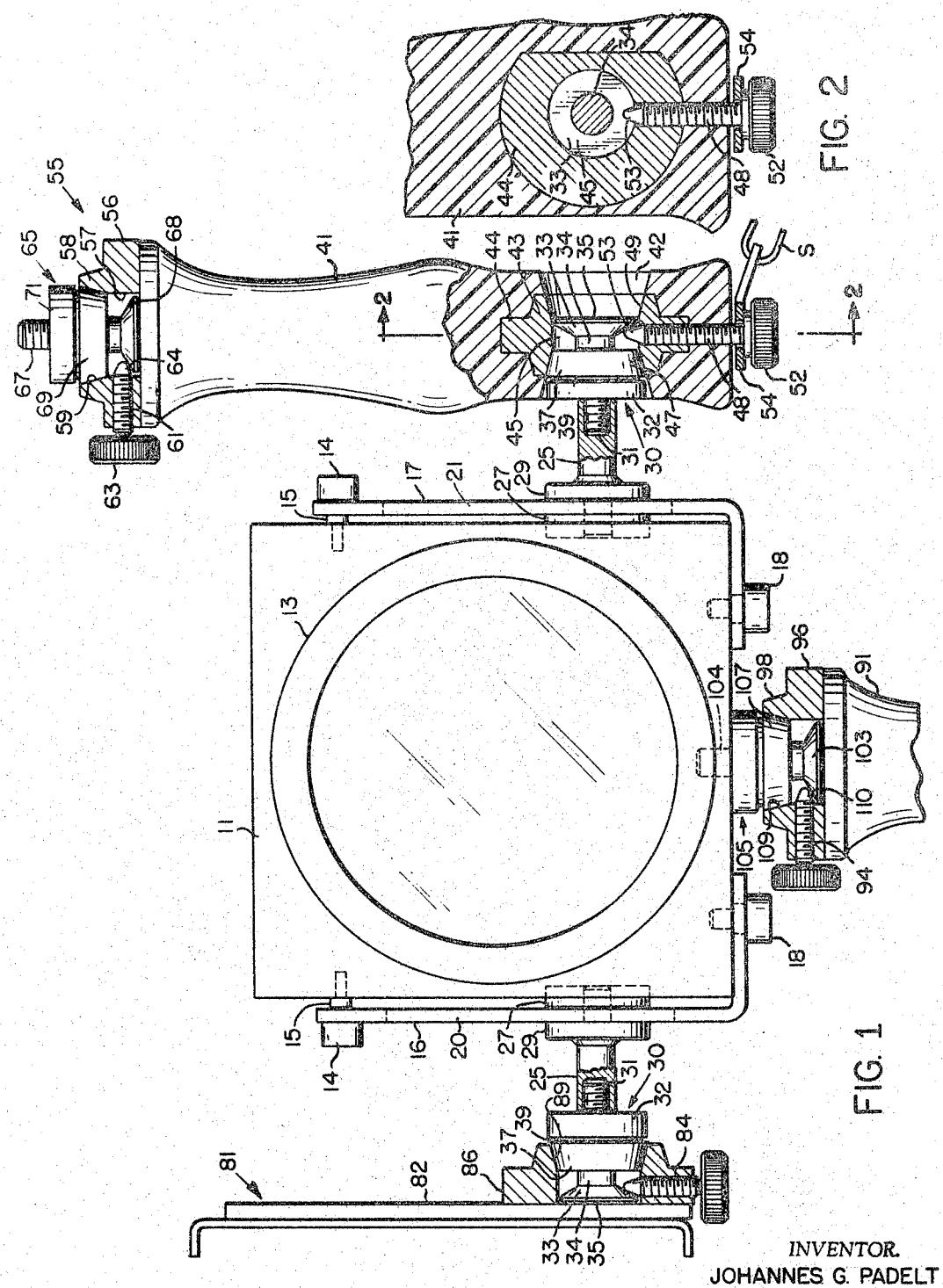

3,333,519
MOUNTING MEANS FOR CAMERA ACCESSORIES
Johannes G. Padelt, Rochester, N.Y., assignor to Graflex, Inc., Rochester, N.Y., a corporation of Delaware
Filed Mar. 1, 1965, Ser. No. 435,979
10 Claims. (Cl. 95—1)

ABSTRACT OF THE DISCLOSURE

Each of three camera accessories, a flash attachment, a tripod, and a handle, contains a socket to receive a mounting stud that is fixed to the camera, or to a camera accessory. A locking screw threads radially into the socket to engage in a groove in the head of the mounting stud to hold the stud in the socket. Each attachment is rotatably adjustable about its associated stud, when its locking screw is partially loosened, and is removable from the stud when its screw is fully loosened.

---

This invention relates to a camera, and more particularly, to means for removably mounting camera accessories such as a handle, a flash attachment, a tripod, or the like to a camera.

Usually a camera is secured to a tripod by a stud or bolt, and usually other accessories, such as brackets for holding flash equipment, supporting handles, etc., are secured to the camera by screws or bolts. This type of connection has the disadvantage that the screw, bolt or stud must be threaded snugly into place to prevent undesired relative movement between the camera and the accessory during the taking of a picture; and must be unthreaded again to remove the accessory from the camera. Ths threading and unthreading operations take time; and in the time it takes to fasten the accessory to or remove it from the camera the picture may be lost. Moreover, with a screw, bolt or stud connection a given accessory will always have the same, fixed position, relative to the camera housing, which is sometimes not the most convenient position for the photographer. Also since the mounting means usually differs for different accessories it has not been possible heretofore to mount the accessories interchangeably on different parts of the camera.

One object of the invention is to provide a means for much more quickly securing an accessory to or removing it from a camera than is possible with screws, bolts or studs, or other known securing means.

Another object of this invention is to provide means for securing accessories to cameras, which will permit the accessories to be mounted interchangeably and in different positions relative to the camera housing.

A further object of this invention is to provide mounting means of the character described, which is simple and inexpensive in structure, and which may be used for readily, adjustably, and removably securing various accessories to a camera.

A more specific object of this invention is to provide identical mounting means for interchangeably and adjustably securing several different types of accessories to different points on a camera housing.

Other objects of the invention will be apparent hereinafter from the specification and from the recital of the appended claims, particularly when read in conjunction with the accompanying drawing.

In the drawing:

FIG. 1 is a front elevational view showing a camera housing having various camera accessories secured thereto by mounting means made in accordance with different embodiments of this invention, certain parts being illustrated fragmentarily, and certain other parts being broken away and shown in section; and FIG. 2 is a fragmentary sectional view taken along the line 2—2 in FIG. 1 looking in the direction of the arrows.

In FIG. 1 the camera is shown as having a handle attached to it for holding it while taking a photograph, and a bracket for holding flashlight equipment. It is also shown as mounted on the top of a tripod. The handle, the flashlight equipment and the tripod are all secured to different points on the camera housing by identical mounting means made according to the present invention; and not all three of these accessories need be secured to the camera at any one time, nor in the particular positions shown. The camera might have only one of these accessories secured to it; or it might have any two of them; or it might have all three of them. It is illustrated as having all three of them secured to it in order to illustrate the range of utility of the invention.

Referring now to the drawing by numerals of reference, 11 designates generally the camera casing or housing, and 13 denotes the lens mount thereon. Removably secured through bolts 14 and spacers 15 to opposite sides, respectively, of the housing 11 are the vertically disposed legs of two L-shaped brackets 16 and 17, respectively, whose other legs are secured to the underside of the housing 11 by screws 18.

The brackets 16 and 17 may be of conventional construction and be used as heretofore for mounting flash equipment or a supporting handle on the camera. Here, however, each bracket carries a stud or spindle 25 having a threaded end which extends through a slot in the vertical leg of the bracket 16 or 17, and which has an integral enlarged diameter cylindrical disc portion 29 that is fastened against the outside face of the associated bracket 16 or 17 by a nut 27 that threads on the threaded end of the stud. The flash equipment, handle, or the like is supported on the spindle 25 by the novel mounting means of the present invention.

In each case this means includes a male fitting or head 30, which at one end has a portion 31 that threads into the outer end of a stud or spindle 25, and at its opposite end has an inwardly-facing truncated flat conical portion 33, which has a flat outer face 35. Between the threaded portion 31 and the conical portion 33, each head 30 is formed with a cylindrical disc portion 32 and a truncated conical clamping portion 37. The conical clamping portion 37 confronts the conical portion 33, but is steeper than the cone portion 33. The included angle of cone 37 in the case shown is approximately 20°; and the included angle of cone 33 is approximately 120°. Portion 37 is separated from the truncated conical portion 33 by a reduced diameter cylindrical portion 34; and the cylindrical portion 32 is separated from the truncated conical clamping portion 37 by a groove 39.

FIG. 1 shows at the right how a handle 41 for holding the camera may be secured to the camera by the quick-locking device of the present invention. Handle 41 is of conventional shape. It is an elongated rigid member, which may be shaped intermediate its ends in any suitable manner to provide a convenient grip for holding it. The handle has a bore or aperture 42 extending through it adjacent its lower end (FIG. 1); and mounted in the handle coaxial of this aperture is a metal sleeve or receptacle 43, which has an external circumferential flange 44 that is embedded in the handle. Sleeve 43 has therethrough a central cylindrical bore 45, opposite ends of which are shaped to form two outwardly diverging conical seats or bearing surfaces 47 and 49. These surfaces have the same cone angle as the portion 37 of head 30 and are complementary thereto. They are adapted to receive selectively the conical clamping portion 37 of head 30.

Clamping of the handle to the head is effected by a screw 48. Screw 48 extends through the lower end of the handle 41 and threads into the sleeve 43. At its inner end the screw has a conical tip 53 which engages against the conical portion 33 of the head. At its outer end the screw 48 has a knurled head 52 by which it may be rotated. When the handle 41 is mounted with the conical portion 37 of the stud seated on the conical portion 47 of the sleeve 43, and the screw 48 is threaded inwardly, the tip 53 of the screw creeps up the relatively flat conical surface 33 and pulls the relatively steep conical surface 37 quickly into firm locking engagement with the conical surface 47 of the ring, thus firmly locking the handle to the bracket 21.

A hand carrying strap S for the camera may be secured at one end to the handle 41 by a link 54, which surrounds the screw 48 beneath its head 52.

Further than this the mounting device of the present invention permits quick adjustment of the handle to any desired angle relative to the camera. For instance, if the photographer desires to take pictures over the heads of a crowd he can tilt the camera relative to the handle so that while holding the handle erect, the camera itself can be tilted slightly downward to take a picture of a subject surrounded by a crowd. All that the photographer needs to do is to loosen screw 48, tilt the camera to the desired angle relative to the handle and tighten the screw again. This can be done in an instant. To loosen the handle for rotation it takes but a part turn of the screw 48. Thus with a part turn of the screw the handle may be secured or released for adjustment.

For greater universality, the handle 41 shown is not only connected to the camera by a mounting device constructed according to this invention, but itself carries a second such mounting device whereby other photographic accessories, such as flash equipment can be mounted on it. This second mounting device, which is denoted generally at 55, also permits fastening the handle to the bottom of the camera for supporting the camera thereby. This second mounting device 55 will now be described.

It comprises a ring or socket member 56, which is generally similar to member 43, and is suitably secured to the upper end (FIG. 1) of the handle 41. Ring 56 has a cylindrical bore 57 for a portion of its height and a steep, inverted conical bore portion 59 for the remainder of its height. Bore portion 59 is the internal surface of a reduced diameter annular flange 58 that is integral with ring 56 at its upper end. Adjustably threaded radially into the ring 56 is a screw 61, which has a knurled head 63 on its outer end for adjusting it, and a generally conical tip 64 at its inner end.

Removably secured in the ring 56 is a coupling head 65 identical to the heads 30. It is formed with two opposed conical portions 68 and 69, both of which are adapted to be positioned in the bore of the ring 56. Conical portion 68 is of smaller, flatter cone angle than conical portion 69 and is adapted to be engaged by the conical tip of screw 61. Conical portion 69 is adapted to seat in the complementary conical portion 59 of the ring 56. When the screw 61 is threaded up into the ring 56, the tip 64 pulls the part 69 down into its seat 59 and firmly fastens the head 65 to the ring 56. The coupling member is threaded at its upper end, as denoted at 67, to thread into the socket of a flash attachment or into the bottom of the camera. Below its threaded portion is a disc portion 71 against which the flash attachment, camera, or other device coupled to the handle is seated.

FIG. 1 also shows how a conventional flash attachment 81 may be secured to a camera with a mounting device constructed according to the present invention. Secured to one side 82 of the attachment 81 is a ring 86, which is identical in configuration to the ring 56. The ring 86 has a radially-extending screw 84 in it for securing the coupling member 30 to the ring by engagement with the conical portion 33 of the coupling member to pull the conical portion 37 of the coupling member down into its seat 89 in the ring, all similar to the corresponding parts of the mounting device 55.

As previously stated, a device made according to the present invention may be utilized for removably fastening a camera to a tripod head. Thus, as shown in FIG. 1, there may be secured to the tripod head 91, with its flanged end 98 facing upwardly, a ring 96, which is identical to the above-described rings 86 and 56. Removably secured in the ring 96 by screw 94 is a coupling member or head 105, which is identical to the coupling member or head 65 secured in the ring 56. The externally threaded stud portion 104 of this member 105 is threaded into the conventional threaded socket formed in the bottom of the camera case 11, so that when the screw 94 is threaded in to pull the conical portion 107 of the coupling member 105 down into conical bore portion 109 of ring 96 by engagement of the conical head 110 of the screw with the conical portion 103 of the coupling member, the camera will be rigidly fastened to the tripod. As in the previous instances, the part held, here the camera, may be adjusted angularly about a vertical axis on the tripod head merely by loosening screw 94 and making the desired adjustment.

In use, one or more of the accessories 41, 81 or 91, may be mounted on the camera housing in the manner illustrated simply by slipping a coupling member into a ring and tightening up a screw 48, 84, 94. Moreover, each accessory may be adjusted angularly on the camera merely by loosening the associated screw 48, 84, or 94 and rotating the coupling member 30, 105 in the ring 43, 86 or 96.

The ring 43 is, in effect a double-action receptacle. Its bore is identically shaped at opposite ends thereof. Hence, the handle 41 may be mounted on a member 30 at either side of the camera with the handle face forward. Thus, the handle may be mounted on the bracket 16, in lieu of the flash attachment 81 by inserting the coupling member 30, which is secured to the bracket 16, into the right hand end of the opening 42 in the handle 41, so that the flatter cone portion 33 of the coupling member extends into the cylindrical portion 45 of this opening at the left hand end thereof, as viewed in FIG. 1, and tightening up on screw 48 to pull the steeper conical portion 37 of this coupling member down onto the conical seat 49 in the bore of ring 43.

From the foregoing it will be apparent that conventional camera accessories can be quickly secured to or removed from a camera by fixing to the camera, or to brackets secured thereto, one or more of the identical heads 30, 65 or 105, and by fastening to the accessories cooperating ring members such as 43, 56, 86, 96. Moreover, the members disclosed, permit greater latitude in adjusting the various attachments relative to the camera proper. Moreover, since all of the coupling heads 30, 65 and 105 are identical, it will be apparent that any one of them may be utilized for adjustably and interchangeably mounting any one of the disclosed accessories on the camera, thereby helping to minimize manufacturing costs. For instance, the handle 41 may be mounted selectively and adjustably on either of the brackets 16 or 17, or, by means of the head 65 or 105 may be mounted beneath the bottom of the camera housing in place of the tripod 91. When the handle 41 is mounted on either side of the camera housing, it is also possible, of course, to rotate the handle downwardly from the position shown so that it may be gripped without interference from the camera housing.

While the invention has been described in connection with several embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In combination, a camera housing and means removably connecting said housing and an accessory one to the other, comprising
   (a) a first member secured to said housing,
   (b) a second member secured to said accessory,
   (c) one of said members having a socket,
   (d) the other of said members having thereon a head removably seated in said socket,
   (e) said one member having in its socket a first conical internal surface, and said head having a second, mating conical external surface slidably fitting into said socket to seat on said first surface to limit the entry of said head into said socket,
   (f) said head having thereon a third conical external surface coaxial with the other two conical surfaces, when said head is seated in said socket, and oppositely disposed to said second surface and spaced axially therefrom, and
   (g) a third member adjustably mounted in said one member and disposed to project into the space between said second and third surfaces without engaging said second surface, and having a locking surface frictionally engaging said third conical surface releasably to hold said head against movement in said socket.

2. The combination as defined in claim 1, wherein said third member is adjustable radially of the socket axis between a locking position, in which its locking surface is conical and seats directly against and coacts with said third surface, and a released position in which its locking surface is disengaged from said third surface.

3. In combination, a camera housing and means removably connecting said housing and an accessory one to the other, comprising
   (a) a first member secured to said housing,
   (b) a second member secured to said accessory,
   (c) one of said members having a socket,
   (d) the other of said members having thereon a head removably seated in said socket,
   (e) said one member having in its socket a first tapered internal surface, and said head having a second, correspondingly tapered external surface slidably fitting into said socket,
   (f) said head having thereon a third tapered external surface, and
   (g) a third member adjustably mounted in said one member and having a locking surface frictionally engaging said third tapered surface releasably to hold said head against movement in said socket,
   (h) the two conical surfaces on said head confronting one another,
   (i) said second conical surface being steeper than said third conical surface,
   (j) said first conical surface having the same cone angle as said second conical surface, and
   (k) said third member comprises a screw which threads into said socket radially thereof and engages said third conical surface to pull said second conical surface down onto its seat on said first conical surface when said screw is threaded into said socket.

4. The combination as defined in claim 3, wherein
   (a) said socket member has a pair of internal conical bore walls at opposite ends, respectively, each of which converges inwardly so that said head can be inserted into said socket member from either end thereof and secured therein.

5. A device for removably and adjustably coupling a camera accessory to a camera, comprising
   (a) a first member adapted to be secured at one end to the camera and having at its opposite end a coupling head,
   (b) a second member having a conical bore and adapted to be secured to said accessory,
   (c) said head being insertable into said conical bore, and having a first conical surface, which is engageable with the wall of said bore coaxially thereof and which is of the same cone angle as said bore, and a second conical surface which confronts said first conical surface, and
   (d) a screw mounted in said second member and having a conical tip at its inner end and being adjustable in one direction to engage said tip with the second conical surface, when the latter is positioned in said bore, thereby to pull said first conical surface into said bore to hold said head in said bore, said screw being adjustable in the opposite direction to disengage its tip from said second conical surface to permit withdrawal of said head from said bore.

6. A device as defined in claim 5, wherein said first conical surface is steeper than said second conical surface.

7. A device as defined in claim 5, wherein
   (a) said conical bore is part only of an aperture extending through said second member,
   (b) said second member has a second conical bore part of the same cone angle as the first-named conical bore part and coaxial with said first-named conical bore part and which is disposed at the opposite end of said aperture from said first-named conical bore part, and
   (c) the smaller ends of said conical bore parts confront one another, whereby said head may be inserted into said aperture from either end thereof, and locked therein by said screw.

8. A coupling device for removably and adjustably securing together a pair of members, comprising
   (a) a ring secured in an opening in one of said members, and having at one end thereof a conical bore portion, which communicates at its inner small end with a cylindrical bore portion formed in said ring intermediate the ends thereof,
   (b) a stud secured at one end to the other of said members, and having a first conical surface, which is disposed in said cylindrical bore portion coaxially thereof, and a second conical surface coaxial of and confronting at its smaller end the smaller end of said first conical surface, and which is seated on the wall of said conical bore portion, and
   (c) a screw adjustably threaded into said ring radially of said cylindrical bore portion, and projecting at its inner end into said cylindrical bore portion, and frictionally into engagement with said first conical surface to hold said stud and said ring against movement relative to one another.

9. A coupling device as claimed in claim 8, wherein said second conical surface is steeper than said first conical surface.

10. The combination with a camera having a threaded socket in its bottom for attaching it to a tripod,
    (a) a handle for holding the camera,
    (b) means for releasably securing said handle to a side of the camera, and
    (c) means including a screw fastened to the top of said handle for releasably securing said handle to the bottom of the camera by threading the screw into the socket, said means for releasably securing the handle to a side of the camera comprising
       (1) a coupling member secured at one end to a side of the camera and having a first truncated conical portion at its other end, the smallest diameter part of which faces said one end, and a second truncated conical portion intermediate its ends which is coaxial of said first conical portion but is spaced axially from said first conical portion and which has its smallest diameter part facing the smallest diameter part of said first truncated conical portion, said second conical portion being steeper than said first conical portion, (2) said handle having an aperture extending transversely thereof adapted to receive said first and second conical portions, said aperture having an internal conical seat of the same cone angle as said second conical portion and adapted to serve as a seat therefor, and (3) a second screw threaded into said handle and extending radially of the axis of said conical portions into the space between them, said second screw having a conical tip engaging and seating on said first conical portion, whereby when said second screw is threaded up said second conical portion is pulled onto its seat and said coupling member is rigidly secured releasably to the side of the camera, and wherein the means for releasably securing the handle to the bottom of the camera comprises (4) a second coupling member having integral therewith at one end thereof the screw for releasably securing the handle to the bottom of the camera, (5) said second coupling member having a third truncated conical portion at its other end, the smallest diameter part of which faces the last-named screw, and having a fourth truncated conical portion intermediate its ends which is coaxial of said third conical portion but is spaced axially from said third conical portion and which has its smallest diameter part facing the smallest diameter part of said third conical portion, said fourth conical portion being steeper than said third conical portion, (6) a ring secured on the top end face of said handle and adapted to receive said third and fourth conical portions, said ring having an internal conical seat of the same cone angle as said fourth conical portion and adapted to serve as a seat therefor, and (7) a third screw threaded into said ring and extending radially of the axis of said third and fourth conical portions into the space between them, said third screw having a conical tip engaging and seating on said third conical portion, whereby when said third screw is threaded up said fourth conical portion is pulled onto its seat in said ring and said second coupling member is rigidly secured to said camera to releasably fasten the camera on the top of said handle.

References Cited

UNITED STATES PATENTS

| | | | |
|---|---|---|---|
| 2,239,201 | 4/1941 | Pyzel | 95—86 |
| 2,479,716 | 8/1949 | Benson | 240—2 |
| 2,949,838 | 8/1960 | Skalabrin | 240—1.3 |
| 3,176,602 | 4/1965 | Wilt | 95—86 |

NORTON ANSHER, *Primary Examiner.*

RICHARD M. SHEER, *Assistant Examiner.*